United States Patent Office 3,559,266
Patented Feb. 2, 1971

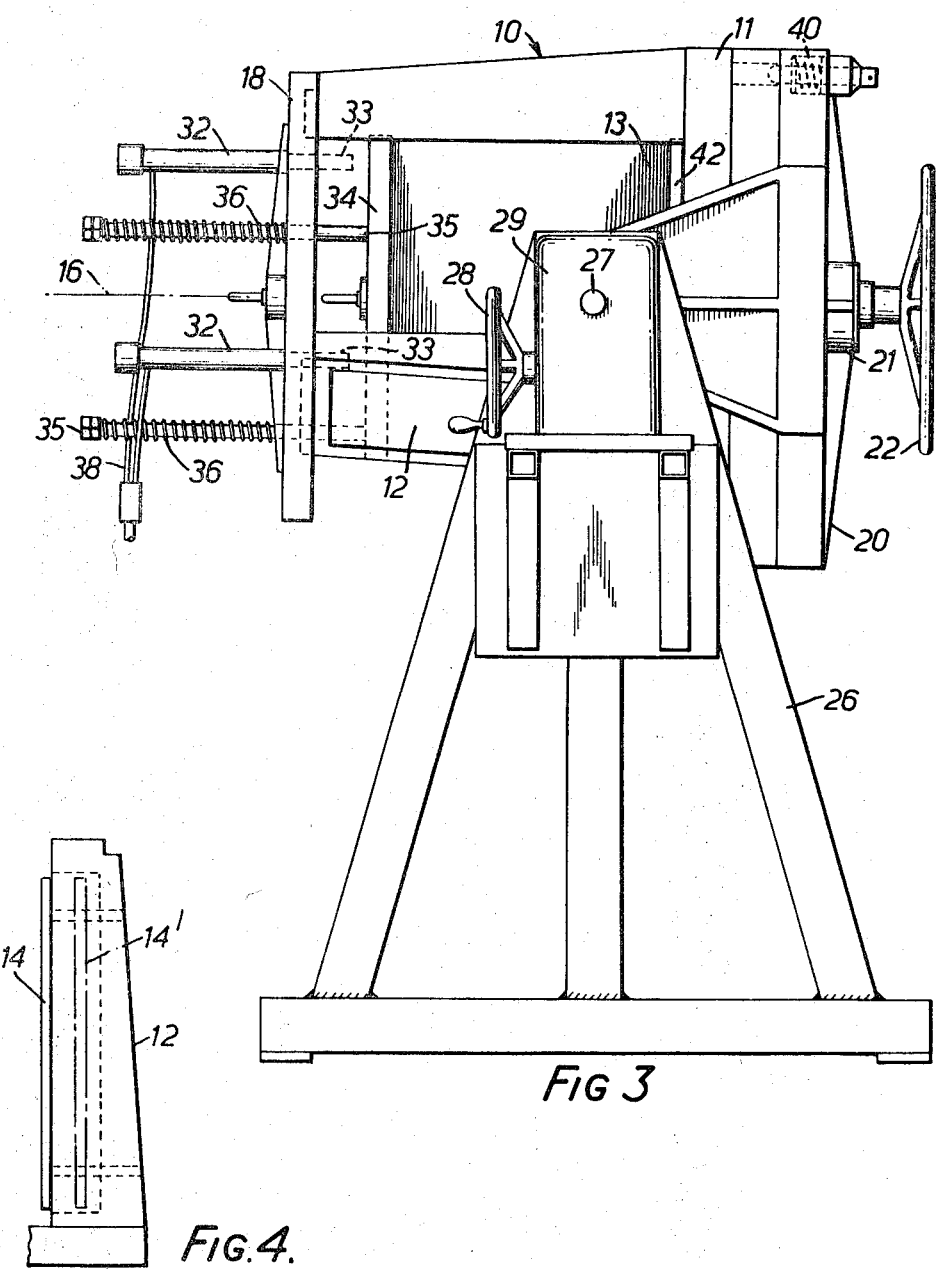

3,559,266
ASSEMBLY TOOL FOR LAMINATED STATOR PACKS
Tony Frederick Miles, Stamford, England, assignor to Newage Lyon Limited, Stamford, England
Filed Aug. 5, 1968, Ser. No. 750,248
Claims priority, application Great Britain, Aug. 4, 1967, 36,026/67
Int. Cl. H05k 13/00
U.S. Cl. 29—203    4 Claims

ABSTRACT OF THE DISCLOSURE

The invention relates to an assembling machine for assembling packs of stamped laminations for welding to constitute the iron stator cores of dynamo-electric machines. The machine comprises a cage into which the laminations can be inserted individually one upon another to form a stack, the cage having a hydraulic press at one end for compressing the stack. The cage is mounted for rotation about the axis of the stack in a cradle which is itself pivoted for rotation about a horizontal axis transverse the pivotal axis of the cage, so that after a stack of laminations has been inserted into the cage with its axis vertical and has been compressed by the hydraulic press, the cage can be swung down to a horizontal orientation with the stack still compressed in it by the press, to facilitate the welding of the edges of the laminations together. Locking means is provided for locking the cage in a number of predetermined angular positions convenient for performing the welding operation.

---

This invention relates to the production of laminated stator packs for dynamo-electric machines, and is concerned with providing an assembling machine or building fixture by means of which a stack of steel stator laminations can be assembled together, compressed and seam-welded into a stator pack without handling between the successive operations.

According to the present invention an assembling machine for the production of laminated stator packs comprises a locating cage in which individual stator laminations can be stacked one upon another in correct locations, the cage having power-actuated ram means at one end by which the stack of laminations can be compressed, and the cage being rotatably mounted in a supporting cradle for rotation relatively thereto about a pivotal aris corresponding to the axis of an assembled stack of laminations in the cage, and the supporting cradle being itself pivotally mounted for angular movement about a horizontal axis between a position in which the pivotal axis of the cage is vertical and a position in which the pivotal axis of the cage is horizontal.

Thus the laminations can be inserted into the cage with the cage pivotal axis vertical and the stack of laminations can be compressed in the cage to the desired extent, after which the whole cage can be swung through 90° in its supporting cradle so that its pivotal axis is horizontal. In this position the cage can be turned through successive angles about its now horizontal pivotal axis to expose successive areas of the surface of the compressed stack at a convenient height and location for seam-welding.

Figure 1:
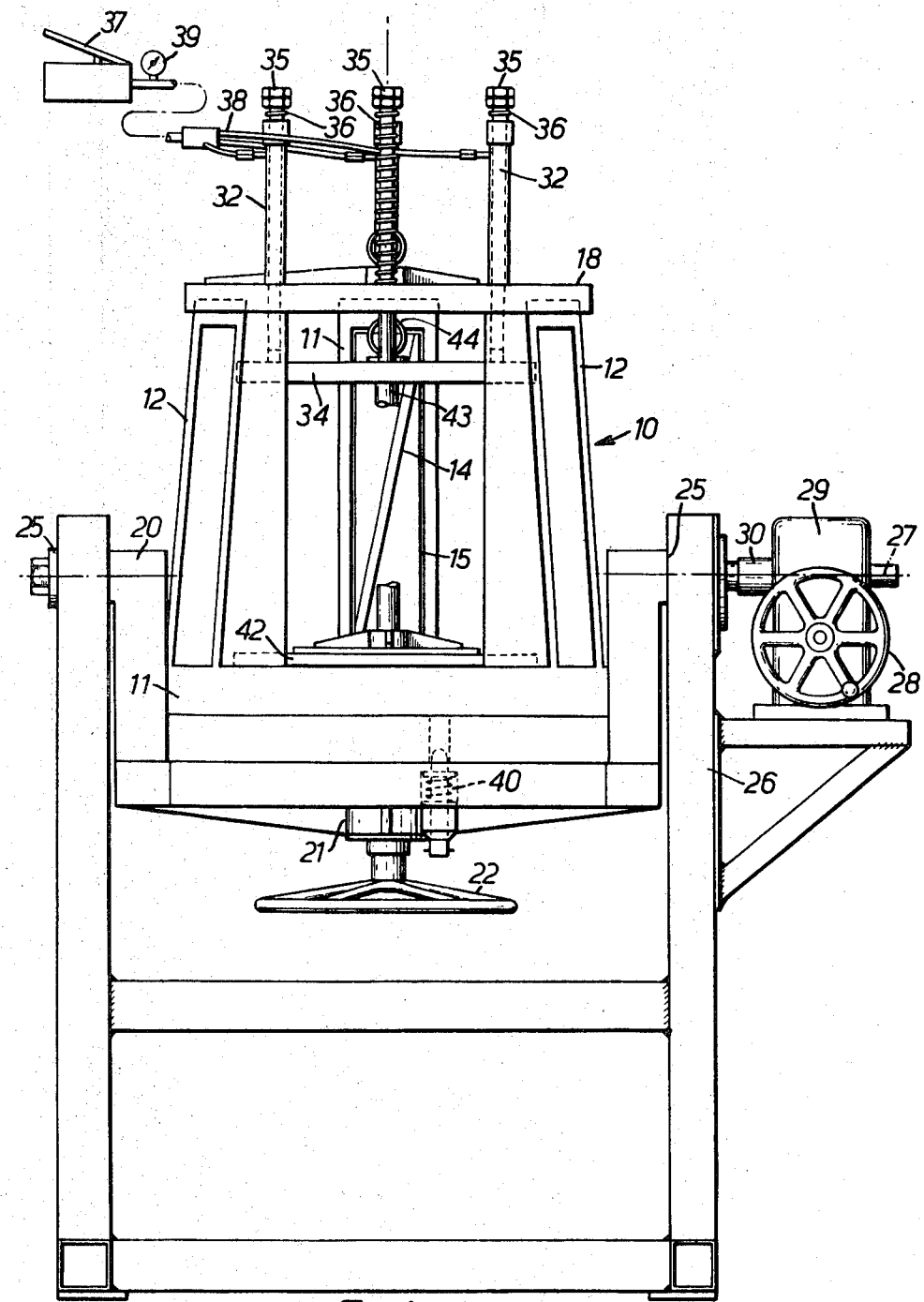
Figure 2:
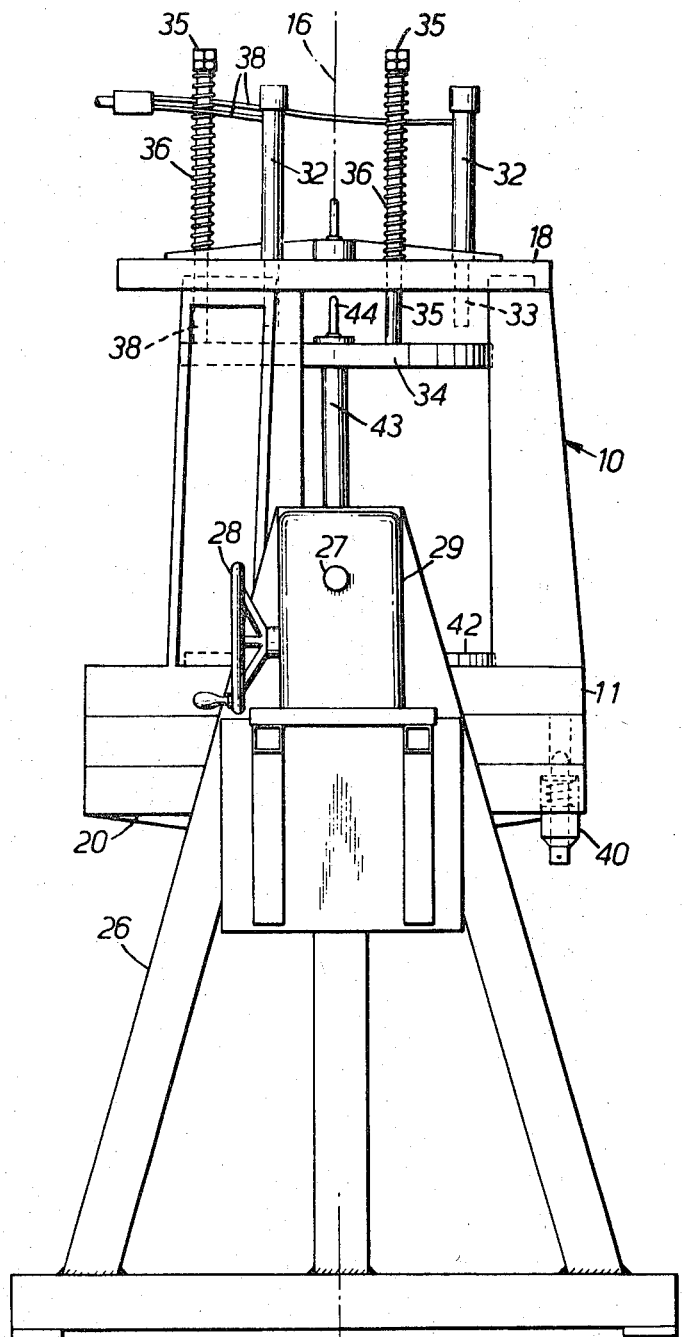

The invention may be carried into practice in various ways, but one specific embodiment will now be described by way of example only with reference to the accompanying drawings, in which FIG. 1 is a side elevation of a stator assembly tool with its cage in the vertical-axis position, FIG. 2 is an end elevation of the tool of FIG. 1, FIG. 3 is a view similar to FIG. 2 but with the cage tilted to its position with its axis horizontal, and FIG. 4 is a detail view of the retractible key and keyblock in one of the cage arms.

In the illustrated embodiment, an assembling machine for stator laminations has a cage 10 which comprises a skeleton drum made up of a disc-shaped base plate 11 with three angularly-spaced side arms 12 extending from its periphery to receive and locate the stack of laminations 13 (FIG. 3). Projecting inwardly from one of the locating arms is a retractible key 14 which corresponds with a keyway cut in the edge of each lamination. As shown in FIG. 4, the key 14 is retained in a key block 15 which is housed in a recess in the locating arm 12, and can be retracted into the thickness of the arm 12 to a position 14' in which the key is below the inner surface of the arm. The key 14 is shown as being skew, but in other cases it may be parallel to the cage axis 16.

The cage 10 is also provided with a detachable top plate 18 which can be fitted to the free outer ends of the three locating arms 12 when a required number of the laminations 13 have been inserted into the cage, and which also carries a hydraulic press 19 to be described later. The cage 10 is pivotally mounted in a supporting cradle 20 by means of a bearing 21, and is provided with a hand wheel 22 below the base of the cradle 20 by which the cage 10 can be rotated manually in the cradle about its pivotal axis 16, which coincides with the stator axis of the stack of the stator laminations 13 inserted in the cage. The cradle 20 is itself journalled by means of trunnions 25 in a fixed floor-mounted base frame 26, enabling the cradle 20 together with the cage 10 to be turned through an angle of 90° about the horizontal trunnion axis 27, between the position shown in FIG. 2 in which the pivotal axis 16 of the cage 10 is vertical and the position shown in FIG. 3 in which it is horizontal. For this purpose a second hand wheel 28 is provided, mounted on the base frame 26 and acting through a reduction gearing 29 on the cradle shaft 30.

The top plate 18 of the cage 10 carries a set of three hydraulic rams 32 whose ram plungers 33 act on a pressure plate 34 which is supported by sliding guide rods 35 in the top plate 18. The guide rods 35 are spring-loaded upwards by means of springs 36, but when the rams 32 are actuated they press the pressure plate down on a stack of laminations 13 in the cage 10. The rams 32 are supplied from a hydraulic pump 37 through flexible pressure lines 38 and a pressure gauge 39 is provided.

In use, the laminations 13 are inserted one by one into the cage 10 with the latter in its vertical-axis position of FIGS. 1 and 2, and the top plate 18 is then fitted. The hydraulic pumps 37 are then actuated to cause the rams 32 to force the pressure plate 34 down on the stack of laminations so as to compress the stack to the desired extent, after which the hydraulic pressure is released, the key block 15 is withdrawn to retract the key 14 into the locating arm 12 of the cage and the hydraulic pressure is then re-applied by means of the pump 37 to hold the stack of laminations 13 in the relative angular positions determined previously by the key 14.

The whole cage 10 in its supporting cradle 20 is then swung down from its vertical to its horizontal position of FIG. 3 by means of the hand wheel 28, in preparation for the seam-welding of the stator pack by the application of runs of weld down the outside surface of the stack of laminations 13. Six equally-spaced runs of weld are required, extending parallel to the axis of the stator pack, and to enable these weld runs to be conveniently made the cage 10 is turned through six successive angles of 60° about its now-horizontal pivotal axis 16 by means of the hand wheel 22, and is held in each angular position in turn by means of a locking plunger 40 whilst a weld run is being made in a horizontal direction at a convenient working height. The locking plunger 40 is spring-loaded and drops into each in turn of six locating recesses formed in the rim of the cage base plate 11, to hold the cage 10 in position whilst each weld run is made, after which the plunger 40 is withdrawn manually to free the cage for indexing through a further 60° angle about the axis 16, until eventually all the weld runs are completed. At this stage the cage 10 is tilted back about the horizontal axis 27 through 90° into its vertical position, the hydraulic pressure is released and the top plate 18 is removed from the cage.

To facilitate the removal of a completed stator pack from the cage 10, the latter is provided with a false bottom plate 42 which is larger than the bore of the stator pack, and on which the stack of laminations 13 is built up. The false bottom plate 42 has attached to its centre a perpendicular bar 34 with an eye bolt 44 at its ends, the bar 43 extending through the bore of the stator pack. The eye bolt 44 can be engaged by the hook of a crane or hoist by which the false bottom plate 42, complete with the welded stator pack resting on it, can now be lifted bodily out of the cage 10.

It will be clear that in the assembly tool or building fixture described it is possible to build up, compress and weld stator packs of varying axial lengths from different numbers of laminations. These stator packs may either have a parallel slot configuration or they may be skewed, a retractible key block 15 of corresponding disposition being used for each such configuration.

What I claim as my invention and desire to secure by Letters Patent is:

1. An assembling machine for the production of laminated stator packs, which comprises a cage in which individual stator lamination can be stacked one upon another, an abutment plate mounted at one end of the cage and power-actuated ram means mounted at the other end of the cage and operable to compress the stack of lamination against the abutment plate, a supporting cradle in which the cage is pivotally mounted for rotation about an axis coaxial with the stack and transverse to said abutment plate, and a fixed supporting structure in which the cradle is journalled for pivotal movement between an upright position in which the pivotal axis of the cage is vertical and a tilted position in which the pivotal axis of the cage is horizontal or near-horizontal.

2. An assembling machine as claimed in claim 1 including a top plate detachably mounted on the end of the cage remote from the abutment plate, and a number of hydraulic jacks constituting the power-actuated ram means and mounted on the removable top plate, the jacks having jack plungers which act on a pressure plate for engagement with a stack of laminations in the cage.

3. An assembling machine as claimed in claim 1 in which the cage includes a side member positioned to extend along the side of a stack of laminations in the cage and transversely to the laminations, the side member carrying a key which is movable between a position in which it projects into the interior of the cage for engagement in a key-way formed by notches in the edges of the lamination, and a position in which it is retracted into the thickness of the side member.

4. An assembling machine as claimed in claim 1 including means for locking the cage in any one of a number of predetermined angular positions in the cradle.

References Cited

UNITED STATES PATENTS

| | | | |
|---|---|---|---|
| 1,608,715 | 11/1926 | Barr | 29—205 |
| 2,199,623 | 7/1940 | Elsey | 29—205 |

THOMAS H. EAGER, Primary Examiner

U.S. Cl. X.R.

29—205; 228—6